United States Patent
Perry

(10) Patent No.: US 9,898,733 B1
(45) Date of Patent: *Feb. 20, 2018

(54) SYSTEM AND METHOD FOR COMBINING DISPARATE COMMERCIAL TRANSACTIONS UNDER A SINGLE IDENTIFICATION MECHANISM

(71) Applicant: Excentus Corporation, Dallas, TX (US)

(72) Inventor: Dickson Perry, Dallas, TX (US)

(73) Assignee: Excentus Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,605

(22) Filed: Dec. 4, 2014

Related U.S. Application Data

(63) Continuation of application No. 13/464,624, filed on May 4, 2012, now Pat. No. 8,939,357.

(51) Int. Cl.
*G07F 19/00* (2006.01)
*G06Q 20/34* (2012.01)

(52) U.S. Cl.
CPC ................. *G06Q 20/357* (2013.01)

(58) Field of Classification Search
CPC ....... G06K 19/06187; G06K 19/06196; G06K 19/12; G06Q 20/145
USPC ........ 235/379, 380, 382, 383, 487, 492, 493
See application file for complete search history.

(56) References Cited

U.S. PATENT DOCUMENTS

| | | |
|---|---|---|
| 4,723,212 A | 2/1988 | Mindrum et al. |
| 4,949,256 A | 8/1990 | Humble |
| 5,185,695 A | 2/1993 | Pruchnicki |
| 5,420,606 A | 5/1995 | Begum et al. |
| 5,483,049 A | 1/1996 | Schulze, Jr. |
| 5,502,636 A | 3/1996 | Clarke |
| 5,710,886 A | 1/1998 | Christensen et al. |
| 5,822,735 A | 10/1998 | De Lapa et al. |
| 5,905,246 A | 5/1999 | Fajkowski |
| 6,000,608 A | 12/1999 | Dorf |

(Continued)

OTHER PUBLICATIONS

U.S. Appl. No. 10/764,930, filed Aug. 12, 2004, Nicholson.

(Continued)

*Primary Examiner* — Daniel St Cyr
(74) *Attorney, Agent, or Firm* — Norton Rose Fulbright US LLP

(57) ABSTRACT

A single swipe system is constructed that allows a person to use a single financial card to receive loyalty benefits (or conduct other non-payment operations) concurrently with a payment transaction. In one embodiment, the user simply swipes his/her financial card and the processing system then concurrently processes a non-payment transaction along with a payment transaction. In some situations, the non-payment transaction can be blended into the payment transaction to allow for discounts and other awards from one or more databases other than the payment processing database. In one embodiment, a single swipe of a financial card connects the consumer with one or more loyalty systems and the consumer can select from the ones desired during the course of payment processing. Discounts and other advantages can be applied to the payment transaction, all based upon a single entry of the consumer's ID.

11 Claims, 3 Drawing Sheets

(56) References Cited

U.S. PATENT DOCUMENTS

| | | | |
|---|---|---|---|
| 6,032,136 A | 2/2000 | Brake, Jr. et al. | |
| 6,076,068 A | 6/2000 | DeLapa et al. | |
| 6,189,787 B1 | 2/2001 | Dorf | |
| 6,298,329 B1 | 10/2001 | Walker et al. | |
| 6,332,128 B1 | 12/2001 | Nicholson | |
| 6,450,407 B1* | 9/2002 | Freeman et al. | 235/492 |
| 6,594,640 B1 | 7/2003 | Postrel | |
| 6,865,547 B1 | 3/2005 | Brake, Jr. et al. | |
| 6,947,898 B2 | 9/2005 | Postrel | |
| 7,054,830 B1 | 5/2006 | Eggleston et al. | |
| 7,072,864 B2 | 7/2006 | Brake, Jr. et al. | |
| 7,096,190 B2 | 8/2006 | Postrel | |
| 7,263,507 B1 | 8/2007 | Brake, Jr. et al. | |
| 7,268,668 B2* | 9/2007 | Beenau et al. | 340/10.1 |
| 7,392,224 B1* | 6/2008 | Bauer et al. | 705/41 |
| 7,506,804 B2 | 3/2009 | Zajkowski et al. | |
| 7,624,040 B2 | 11/2009 | Postrel | |
| 7,624,041 B2 | 11/2009 | Postrel | |
| 7,660,763 B1 | 2/2010 | Brake, Jr. et al. | |
| 7,676,393 B2 | 3/2010 | Postrel | |
| 7,680,687 B2 | 3/2010 | Postrel | |
| 7,680,688 B2 | 3/2010 | Hessburg et al. | |
| 7,686,218 B2 | 3/2010 | Hessburg et al. | |
| 7,707,111 B2 | 4/2010 | Brake, Jr. et al. | |
| 7,716,080 B2 | 5/2010 | Postrel | |
| 7,742,942 B2 | 6/2010 | Nicholson | |
| 7,742,943 B2 | 6/2010 | Postrel | |
| 7,761,378 B2 | 7/2010 | Postrel | |
| 7,765,124 B2 | 7/2010 | Postrel | |
| 7,769,630 B2 | 8/2010 | Postrel | |
| 7,801,799 B1 | 9/2010 | Brake, Jr. et al. | |
| 7,828,206 B2 | 11/2010 | Hessburg et al. | |
| 8,010,405 B1 | 8/2011 | Bortolin et al. | |
| 8,073,736 B2 | 12/2011 | Blagg et al. | |
| 8,195,507 B2 | 6/2012 | Postrel | |
| 8,285,588 B2 | 10/2012 | Postrel | |
| 8,317,094 B2 | 11/2012 | Lehman | |
| 8,423,402 B2 | 4/2013 | Postrel | |
| 8,433,608 B2 | 4/2013 | Bortolin et al. | |
| 8,447,650 B2 | 5/2013 | Postrel | |
| 8,452,647 B2 | 5/2013 | Postrel | |
| 8,452,651 B2 | 5/2013 | Postrel | |
| 8,478,638 B2 | 7/2013 | Postrel | |
| 8,478,640 B2 | 7/2013 | Postrel | |
| 8,489,513 B2* | 7/2013 | Bishop et al. | 705/67 |
| 8,606,631 B2 | 12/2013 | Blagg | |
| 8,612,290 B2 | 12/2013 | Postrel | |
| 8,676,642 B1 | 3/2014 | Sheley | |
| 8,682,791 B2 | 3/2014 | Bies et al. | |
| 8,695,875 B1 | 4/2014 | Segura | |
| 8,701,989 B2 | 4/2014 | Lehman | |
| 8,725,564 B2 | 5/2014 | Postrel | |
| 8,738,429 B2 | 5/2014 | Shepard | |
| 8,775,241 B2 | 7/2014 | Bortolin et al. | |
| 8,781,891 B2 | 7/2014 | Postrel | |
| 8,783,561 B2 | 7/2014 | Wesley | |
| 8,799,063 B2 | 8/2014 | Postrel | |
| 8,799,065 B2 | 8/2014 | Reuthe et al. | |
| 8,939,357 B1 | 1/2015 | Perry | |
| 9,038,893 B2 | 5/2015 | Kirkham | |
| 9,135,612 B1 | 9/2015 | Proctor, Jr. et al. | |
| 9,224,154 B2 | 12/2015 | Wesley | |
| 2002/0107738 A1 | 8/2002 | Beach et al. | |
| 2003/0040964 A1 | 2/2003 | Lacek | |
| 2004/0158493 A1 | 8/2004 | Nicholson | |
| 2004/0220861 A1 | 11/2004 | Morciniec et al. | |
| 2004/0243478 A1 | 12/2004 | Walker et al. | |
| 2004/0249710 A1 | 12/2004 | Smith et al. | |
| 2005/0021401 A1 | 1/2005 | Postrel | |
| 2005/0131761 A1 | 6/2005 | Trika et al. | |
| 2005/0251440 A1 | 11/2005 | Bednarek | |
| 2005/0267800 A1 | 12/2005 | Tietzen et al. | |
| 2006/0190331 A1 | 8/2006 | Tollinger et al. | |
| 2007/0152038 A1 | 7/2007 | Ciancio et al. | |
| 2007/0174126 A1 | 7/2007 | McCall et al. | |
| 2007/0219872 A1 | 9/2007 | Rolf | |
| 2008/0071614 A1 | 3/2008 | Mebruer | |
| 2008/0126208 A1 | 5/2008 | Nicholson et al. | |
| 2008/0208688 A1 | 8/2008 | Byerley et al. | |
| 2008/0221984 A1 | 9/2008 | Abhyanker | |
| 2008/0262928 A1 | 10/2008 | Michaelis | |
| 2009/0030798 A1 | 1/2009 | Otto et al. | |
| 2009/0050692 A1* | 2/2009 | Ludlow | G06Q 30/02 235/380 |
| 2009/0094158 A1* | 4/2009 | Fein et al. | 705/50 |
| 2009/0132381 A1 | 5/2009 | Gangi | |
| 2009/0248518 A1 | 10/2009 | Shigematsu | |
| 2010/0017284 A1 | 1/2010 | Ross et al. | |
| 2010/0094690 A1 | 4/2010 | Beal | |
| 2010/0114683 A1 | 5/2010 | Wessels et al. | |
| 2010/0153205 A1 | 6/2010 | Retter et al. | |
| 2010/0161364 A1 | 6/2010 | Lokowandt et al. | |
| 2011/0071890 A1 | 3/2011 | Hart et al. | |
| 2011/0087531 A1 | 4/2011 | Winters et al. | |
| 2011/0251880 A1 | 10/2011 | Butler et al. | |
| 2012/0029992 A1 | 2/2012 | De Facendis | |
| 2012/0197705 A1 | 8/2012 | Mesaros | |
| 2013/0046605 A1 | 2/2013 | Baron et al. | |
| 2013/0091001 A1 | 4/2013 | Jia et al. | |
| 2013/0246138 A1 | 9/2013 | Johnson et al. | |
| 2013/0248591 A1* | 9/2013 | Look | G06K 19/06187 235/375 |
| 2013/0282468 A1 | 10/2013 | Michael | |
| 2013/0317894 A1 | 11/2013 | Zhu et al. | |
| 2013/0317897 A1 | 11/2013 | Nicholson | |
| 2014/0025518 A1* | 1/2014 | Look | G06Q 20/347 705/21 |
| 2015/0012347 A1 | 1/2015 | Nicholson | |
| 2015/0287068 A1 | 10/2015 | Porco et al. | |

OTHER PUBLICATIONS

Unpublished U.S. Appl. No. 12/832,788 to Perry, et al., filed Jul. 8, 2010 and entitled "Systems and Methods for Redeeming E-Coupons," 17 pages.

* cited by examiner

SYSTEM AND METHOD FOR COMBINING DISPARATE COMMERCIAL TRANSACTIONS UNDER A SINGLE IDENTIFICATION MECHANISM

CROSS-REFERENCE TO RELATED APPLICATIONS

This application is a Continuation of U.S. patent application Ser. No. 13/464,624, filed May 4, 2012, titled SYSTEM AND METHOD FOR COMBINING DISPARATE COMMERCIAL TRANSACTIONS UNDER A SINGLE IDENTIFICATION MECHANISM, and is related to commonly owned patent application SYSTEMS AND METHODS FOR E-COUPON TIES AMONG PLURAL PARTIES, U.S. patent application Ser. No. 12/960,055, filed on Dec. 3, 2010; Systems and Methods For Self-Generation Of E-coupons, U.S. patent application Ser. No. 12/960,072, filed on Dec. 3, 2010; SYSTEMS AND METHODS FOR MANAGING E-COUPONS USING A LIFE PORTAL, U.S. Ser. No. 13/464,680, filed May 4, 2012; and SYSTEMS AND METHODS FOR COORDINATING LOYALTY AWARDS WITH SOCIAL NETWORKING, U.S. Ser. No. 13/464,655, filed May 4, 2012, all of the above-referenced applications are hereby incorporated by reference herein.

TECHNICAL FIELD

This disclosure relates to mechanisms for user identification and more specifically to systems and methods for controlling disparate commercial transactions using a single identification mechanism.

BACKGROUND OF THE INVENTION

It is certainly commonplace for a purchaser of goods or services to use a plastic credit/debit card (hereinafter called financial card) as a mechanism for payment for the transaction. The financial card acts as an identification mechanism to a clearing house (or other back-office processing system) to facilitate payment from an account identified by the financial card to an account identified by the merchant who is processing information from the purchaser's credit card. Typically, the financial card information is communicated to the clearing house by swiping the card through a reader that senses information contained on a magnetic stripe on the card. This sensed magnetic stripe information is then transmitted to the back-office for processing. In some situations, RFID and mobile devices/apps can be used.

It is also commonplace to identify users for purposes other than financial transactions, such as for loyalty rewards, by also using a plastic card. Typically, but not always, these loyalty cards contain information in bar code format and thus the bar code information is sent to a back-office processing center to identify the participant.

In some situations, the financial card is used to identify a user for purposes other than payment of a commercial transaction. One example of such use occurs when a person swipes a financial card at an airline kiosk in order to obtain a boarding pass. In such a situation, the information encoded on the financial card's magnetic stripe is used by the airline's back-office to identify the user.

However, while the financial card has the capability of performing financial as well and non-financial transactions, these disparate operations are handled separately. Thus a person wishing to receive loyalty card benefits must produce a loyalty card (or otherwise inform the merchant of the consumer's ID) and have the information transmitted from the loyalty card to a loyalty processing center and then that same person must subsequently swipe his/her financial card to pay for the transaction. Note that in these transactions, any discount or price reduction is performed at the merchant's location before processing the payment information, thereby requiring at least two separate transaction steps.

BRIEF SUMMARY OF THE INVENTION

A single swipe system is constructed that allows a person to use a single financial card to receive loyalty benefits (or conduct other non-payment operations) concurrently with a payment transaction. In one embodiment, the user simply swipes his/her financial card and the processing system then concurrently processes a non-payment transaction along with a payment transaction. In some situations, the non-payment transaction can be blended into the payment transaction to allow for discounts and other awards from one or more databases other than the payment processing database. In one embodiment, a single swipe of a financial card connects the consumer with one or more loyalty systems and the consumer can select from the ones desired during the course of payment processing. Discounts and other advantages can be applied to the payment transaction, all based upon a single entry of the consumer's ID.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 2:
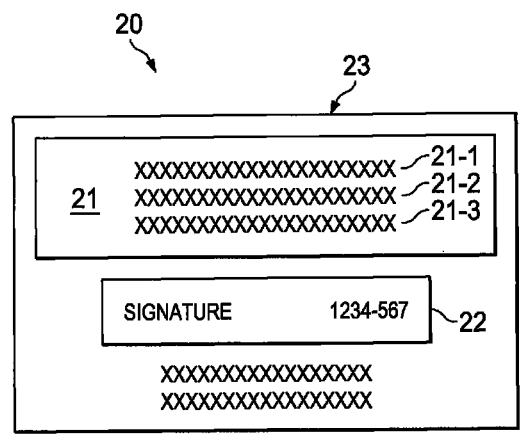
FIG. 2 shows an embodiment of one of many financial card types.

Before beginning a discussion of the use of the invention in a particular set of embodiments, it is important to note that while a plastic financial card, such as card 20, FIG. 2, is used as the ID mechanism any type of consumer ID can be substituted and the term "financial card" should be so interpreted. By way of example, and not by way of limitation, electronic wallets, cell phones, PDAs, biometrics (such as finger or eye print, speech, etc.), computers, can be used to identify a consumer for a payment transaction. This single identification can then, as will be discussed below, be used to concurrently process transactions controlled, at least in part, by systems separate from the financial transaction. For convenience herein, it might be easier to think of the fundamental reason for using the ID as the main processing link and any secondary usage of the same ID mechanism as a secondary processing link.

Figure 1:
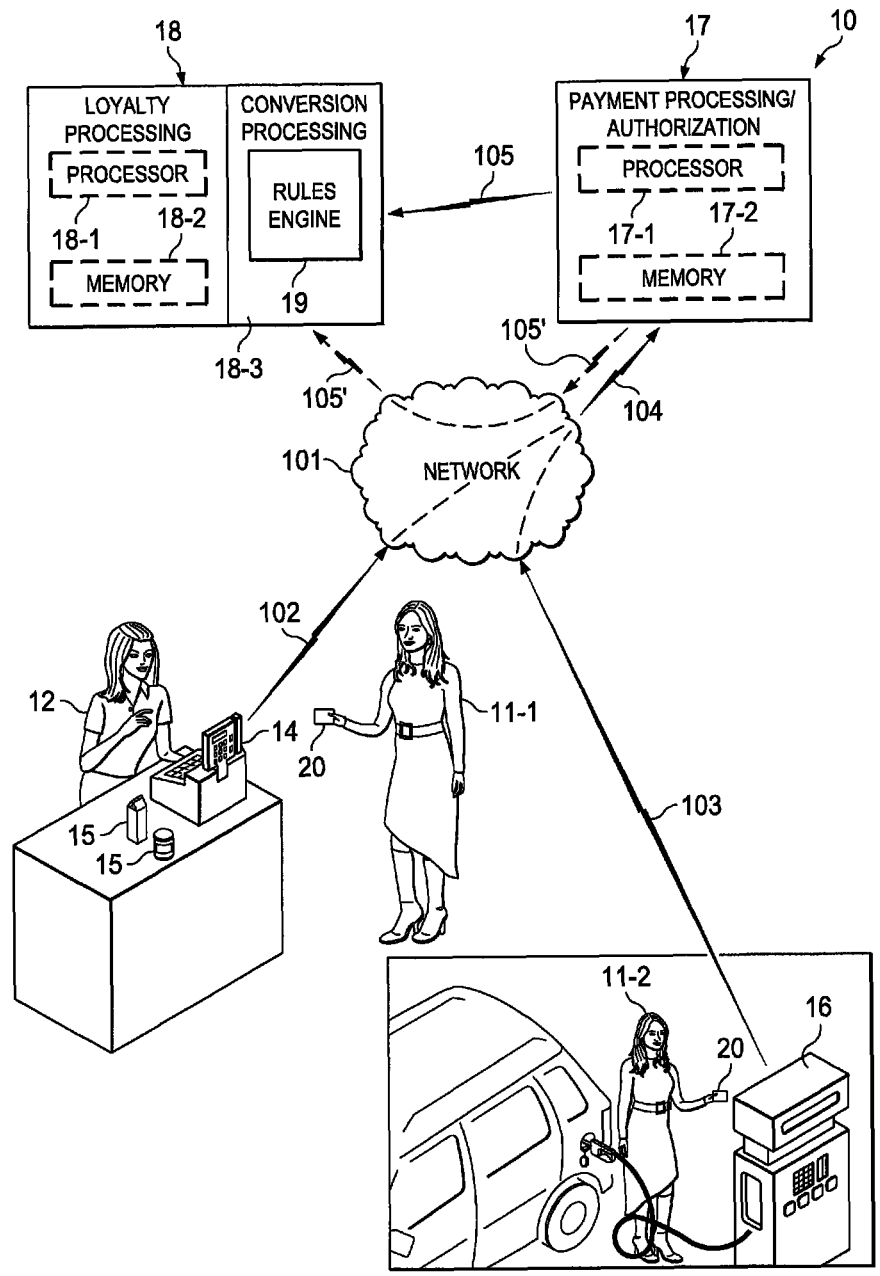
FIG. 1 shows one embodiment of the concepts of the invention used at two different points of sale.

Turning now to FIG. 1, there are shown two disparate processing systems, namely payment processing/authorization system 17 (in the discussion herein this system will be considered the main system) and loyalty processing system 18 (considered in the scenario discussed herein as a secondary processing system). As shown, the main system and the secondary system are shown at different physical locations with a communication channel 105 (or 105') interconnecting them. However, one or more secondary systems can be co-located with the main system, but will be handled with different processing capabilities. For example, main system 17 can be controlled by processor 17-1 and memory 17-2 while processing system 18 can be controlled by processor 18-1 and 18-2. If the two systems were to be collocated a single processor, say processor 17-1 could be used but separate memories 17-2 and 18-2 would be used.

In operation, in one embodiment, a consumer, such as consumer 11-1, would approach clerk 12 with merchandise 15. Consumer 11-1 would present financial card 20 which would be entered into the system, perhaps using swipe reader 14, and the consumer identification information from the financial card would be transmitted, by land line or wirelessly, via connection 102 and through network 101 to payment processing (main) system 17 via connection 104. This operation is well-known and as will be discussed, if the inventive concept were not being employed, then main system 17 would process the ID data and complete (or reject) the transaction. If the transaction is satisfactorily completed, then at some point in time the merchant would be credited with the amount of the purchase minus (in some cases) a processing fee. The consumer, on the other hand, would have debited from his/her account (or in the case of a credit transaction, sent a credit statement for subsequent payment) the amount of the transaction. This operation may entail several back-office steps and data transfer points, but it is all well-known.

One point of departure from prior system operation is that, as will be discussed, the ID used by the main processing system is sued to access one or more separate data bases to obtain information, including loyalty rewards, available to the consumer. As will be discussed, the consumer may be given a choice of which rewards program, or programs, he/she desires to use. Based on the consumer's selection when given a choice, or based on other factors, any loyalty rewards, discounts, etc. can be automatically deducted from the pending transaction. If desired, the results of any such discounts can be shown on the consumer's receipt.

FIG. 1 also shows another type of financial card processing scenario, namely consumer 11-2 using financial card 20 at fuel pump 16 in order to become pre-authorized, via communication link 103 to payment processing/authorization 17 to pump fuel. In this situation, a pre-authorization is vital because once the fuel is pumped into the vehicle it cannot be recovered. In operation, when main system 17 receives a request for pre-authorization that request can be immediately processed while the consumer's Id is sent for secondary processing at one or more secondary locations.

In one embodiment, such secondary processing utilizes conversion processing 18-3 to convert consumer financial ID information into one or more loyalty IDs for processing by each separate non-financial system. If desired, conversion processing could be stand-alone or co-located with either the main the processing system or any one of the secondary processing systems. Information from the secondary systems can be fed back to the consumer via connection 103 or via any other connection, for example by a text message directly to the consumer. Any discounts can then be applied to the actual price charged to the consumer for the fuel.

In some situations, at least one of the secondary processing systems could be something other than a loyalty system. For example, using the concepts discussed herein, a secondary system could be a driver license system, or a driver insurance data base, or a 'wanted driver' database. In such a situation, perhaps a match with the secondary system, based on the usage of a financial card, could result in the refusal to pump fuel and/or a notification to a public safely official. In some situations the secondary processing could be for food stamps or other low income subsidy databases. Based on the above, the secondary transaction may include loyalty programs, government operated data bases, biometric databases, card databases, social network databases, and webservice connections.

FIG. 2 shows one example of a plastic financial card, such as card 20. Such cards are typically issued under a number of International Organization for Standardization standards, such as, ISO/IEC 7810, ISO/IEC 7811, ISO/IEC 7812, ISO/IEC 7813, ISO 8583, and ISO/IEC 4909. These standards define the physical properties of the card, including size, flexibility, location of the magstripe, magnetic characteristics, and data formats. They also provide the standards for financial cards, including the allocation of card number ranges to different card issuing institutions.

Magnetic stripe 21 is located 0.223 inches (5.56 mm) from top edge 23 of the card, and is 0.375 inches (9.52 mm) wide. The magnetic stripe typically contains three tracks, each 0.110 inches (2.79 mm) wide. Tracks 21-1 and 21-3 are typically recorded at 210 bits per inch (8.27 bits per mm), while track 21-2 typically has a recording density of 75 bits per inch (2.95 bits per mm). Each track can either contain 7-bit alphanumeric characters, or 5-bit numeric characters. Track 21-1 standards were created by the airlines industry (IATA). Track 21-2 standards were created by the banking industry (ABA) and track 21-3 standards were created by the Thrift-Savings industry.

Track 21-3 is typically unused by the major worldwide networks, such as VISA, and could be used for secondary processing control if desired. The minimum cardholder account information needed to complete a transaction is present on both tracks 21-1 and 21-2. Track 21-1 has a higher bit density (210 bits per inch vs. 75), and is the only track that contains alphabetic text, and hence is the track that contains the cardholder's name. Accordingly, at least track 1 information should be passed to conversion processing 18-3 to convert the user's financial ID information useful for secondary processing.

Track 21-1 is written with code known as DEC SIXBIT plus odd parity. The information on track 21-1 on financial cards is contained in several formats: A, which is reserved for proprietary use of the card issuer, B, which is described below, C-M, which are reserved for use by ANSI Subcommittee X3B10 and N-Z, which are available for use by individual card issuers:

Track 21-1, Format B:
Start sentinel—one character (generally '%')
Format code="B"—one character (alpha only)
Primary Account Number (PAN)—up to 19 characters. Usually, but not always, matches the credit card number printed on the front of the card.
Field Separator—one character (generally '^')
Name—two to 26 characters
Field Separator—one character (generally '^'
Expiration date—four characters in the form YYMM
Service code—three characters
Discretionary data—may include Pin Verification Key Indicator (PVKI, 1 character), PIN Verification Value (PVV, 4 characters), Card Verification Value or Card Verification Code (CVV or CVK, 3 characters)
End sentinel—one character (generally '?')
Longitudinal redundancy check (LRC)—it is one character and a validity character calculated from other data on the track. Most reader devices do not return this value when the card is swiped to the presentation layer, and use it only to verify the input internally to the reader.

Track 21-2: This format was developed by the banking industry (ABA) and is written with a 5-bit scheme (4 data bits+1 parity), which allows for sixteen possible characters, which are the numbers 0-9, plus the six characters : ; <=>?. The sixteen codes map to the ASCII range 0×30 through 0×3f, which defines ten digit characters, plus those six symbols. The data format is as follows:
Start sentinel—one character (generally ';')
Primary account number (PAN)—up to 19 characters. Usually, but not always, matches the credit card number printed on the front of the card.
Separator—one char (generally '=')
Expiration date—four characters in the form YYMM
Service code—three digits. The first digit specifies the interchange rules, the second specifies authorization processing and the third specifies the range of services
Discretionary data—as in track one
End sentinel—one character (generally '?')
Longitudinal redundancy check (LRC)—it is one character and a validity character calculated from other data on the track. Most reader devices do not return this value when the card is swiped to the presentation layer, and use it only to verify the input internally to the reader.

Since at least one of the tracks of the card contains the user's name and in most situation his/her address, that information can be translated to a loyalty card data base. Also, the consumer can be asked to link his/her loyalty card to his/her financial cards and then conversion processing becomes straightforward. In other situations, track 21-3 can be used to add on loyalty or other secondary processing ID information by the card issuer. For example, states could require financial cards to carry driver license information and/or social security information thus facilitating cross-checks all during a financial transaction.

Continuing in FIG. 2, space 22 is reserved for the card holder's signature and printed ID data.

Figure 3:
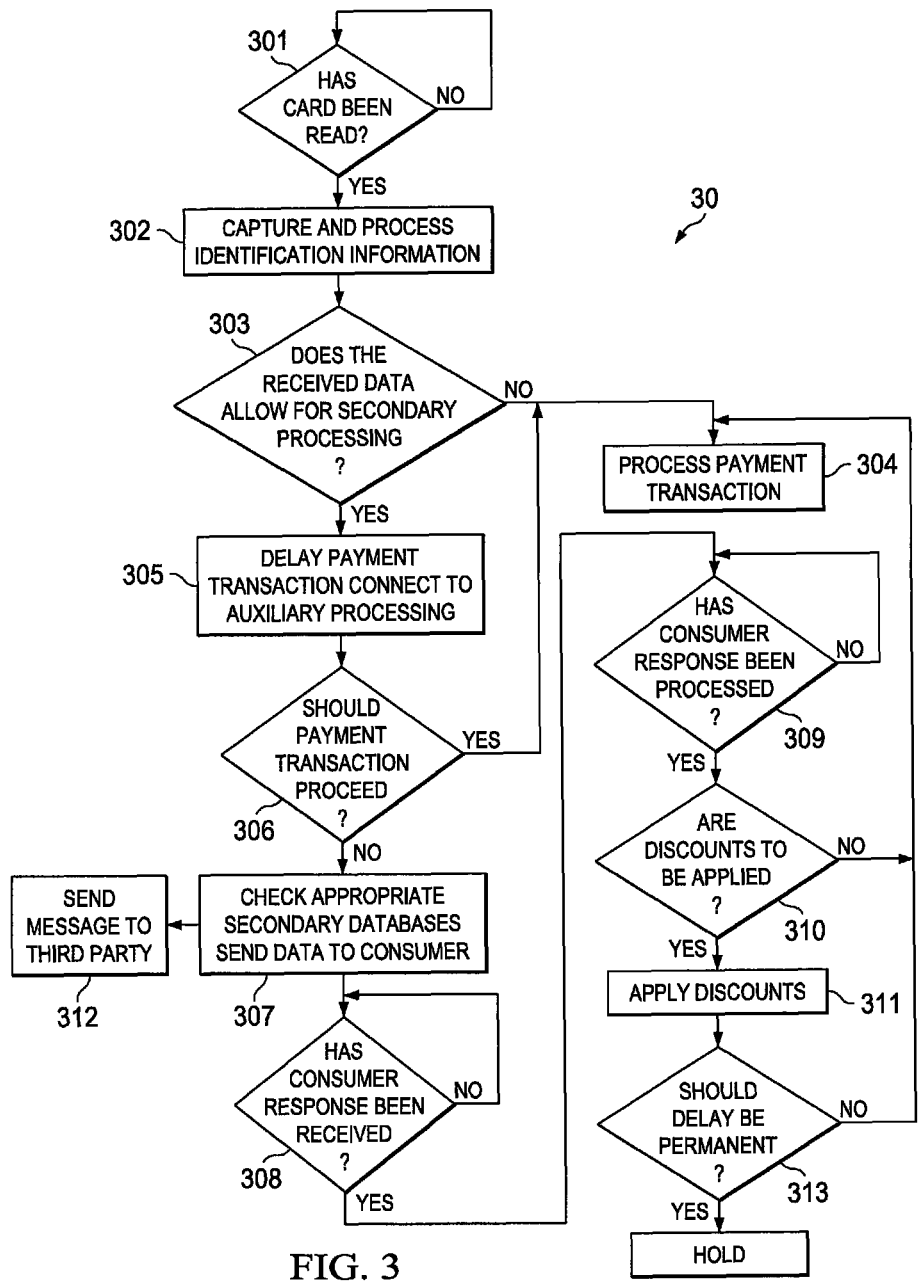
FIG. 3 shows one embodiment of the concepts of the invention used to process disparate transactions based upon a single source ID mechanism.

FIG. 3 shows one embodiment 30 of the concepts of the invention used to process disparate transactions based upon a single source ID mechanism. Process 301 determines if financial card data has been received by a man processing system. If it has, then process 302 captures the required data in sufficient format so as to be able to process the financial transaction as well as to be able to process secondary transactions. In some cases this will require the capturing of information from the third track of a card. In other cases this will require asking the consumer for additional information.

Process 303 checks the data to determine if secondary processing is available for the received data. This checking can be, for example, by conversion processing 18-3, FIG. 1, by comparison against a data base, or by determining if a flag is set in a certain field, or by any other means. If process 303 determines that no secondary processing is available, then process 304 handles the financial transaction in the well-known manner.

If process 303 determines that secondary processing is available, then process 305 delays main process until a determination can be made by process 306 as to whether the secondary processing should occur prior to the main processing or whether main processing should proceed independent from any secondary processing.

If secondary processing is to occur first, then process 307 checks the appropriate secondary sources with the assistance of conversion processing 18-3 and rules engine 19 (FIG. 1) and any discounts appropriate to the transaction being processed are retrieved and communicated to the consumer, if appropriate, via process 307. Process 307 also controls third party notification, such as to the police or other safety official. In some situations, the discounts will be applied directly to the transaction and in some situations the consumer will be given an option as to which discounts or as to which loyalty programs to check.

For example, the consumer might have loyalty programs A, B and C. The rules engine could be set up in advance by, perhaps, using a web interface with the consumer, so that the consumer can be given a choice of using program A, B and/or C. Perhaps program C is one that collects points for some purpose and program A gives discounts. The consumer can then select both A and C under control of process 308. In the case of program A the rules engine, under control of process 309, would calculate any deduction from the price and send a message to main processor 17 via processes 310 and 311 to make the deduction from the financial transaction. If desired, this deduction would show on the ultimate receipt received from the vendor. Also, when the customer receives his/her monthly statement the deduction, as well as any other secondary processing results, could also be displayed.

In the case of program C, at the completion of the transaction points would be calculated and placed in the consumer's account. This differs from current situations in which credit card usage generates points (or other prizes) because in current systems the point accumulation is part of the same main system whereas in the system being described herein the points are being accumulated in a system not associated directly with the main financial processing system.

In some situations it might be appropriate to permanently prevent the transaction. In such a situation, process 313 controls. Such a situation could work, for example, if a government database determined that a problem exits with a particular consumer. In fuel purchase situations refusing to proceed with the financial transaction prevents fuel from being pumped.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A financial card for concurrently providing information for a payment transaction and information for a non-payment transaction, said financial card comprising:
    a magnetic stripe that comprises the following:
        a first track that includes information for initiating said payment transaction;
        a second track that includes information for initiating said non-payment transaction, wherein said non-payment transaction comprises a transaction pertaining to a government operated database, wherein said government operated database is a wanted driver database, wherein said transaction pertaining to said government operated database comprises querying said government operated database to determine whether a cardholder associated with said financial card is identified in said government operated database, and wherein, when said cardholder is identified in said government operated database, a notification is sent to a public safety official; and
        a flag field storing a value that indicates an order for initiating said payment transaction and said non-payment transaction, wherein a first value of the flag field indicates that said payment transaction is to be initiated before said non-payment transaction and wherein a second value of the flag field indicates that said non-payment transaction is to be initiated before said payment transaction,
    wherein said financial card is configured to provide, to a financial card reader, the information for performing said payment transaction, the information for initiating said non-payment transaction, and said value of the flag field in response to a single swipe of the financial card in the financial card reader, and
    wherein setting said value of the flag field to the second value configures said information for initiating said non-payment transaction to decline said payment transaction when said cardholder is identified in said government operated database.

2. The financial card of claim 1 wherein said non-payment transaction further comprises a loyalty benefit transaction and said information for performing said non-payment transaction further comprises loyalty benefit information.

3. The financial card of claim 1 wherein said non-payment transaction further comprises transactions pertaining to a selection from the list consisting of: biometric databases, card databases, and social networking databases.

4. The financial card of claim 1 wherein said magnetic stripe further comprises the following:
    a third track that includes other information for performing said payment transaction.

5. The financial card of claim 1 wherein said information for performing said payment transaction comprises identification information.

6. A financial card for concurrently providing information for a payment transaction and information for a non-payment transaction, said financial card comprising:
    means for storing information, said means for storing information comprising:
        means for storing data for performing said payment transaction; and
        means for storing data for initiating said non-payment transaction, wherein said non-payment transaction comprises a transaction pertaining to a government operated database, wherein said government operated database is a wanted driver database, wherein said transaction pertaining to said government operated database comprises querying said government operated database to determine whether a cardholder associated with said financial card is identified in said government operated database, and wherein, when said cardholder is identified in said government operated database, a notification is sent to a public safety official; and
    means for storing a flag field comprising a value that indicates an order for initiating said payment transaction and said non-payment transaction, wherein a first value of the flag field indicates that said payment transaction is to be initiated before said non-payment transaction and wherein a second value of the flag field indicates that said non-payment transaction is to be initiated before said payment transaction,
    wherein said financial card is configured to provide, to a financial card reader, the data for performing said payment transaction, the data for initiating said non-payment transaction, and said value of the flag field in response to a single swipe of the financial card in the financial card reader, and
    wherein setting said value of the flag field to the second value configures said data for initiating said non-payment transaction to decline said payment transaction to prevent fuel from being pumped when said cardholder is identified in said government operated database and said financial card reader is integrated with a fuel pump.

7. The financial card of claim 6 wherein said non-payment transaction comprises a loyalty benefit transaction and said data for initiating said non-payment transaction comprises loyalty benefit data.

8. The financial card of claim 6 wherein said non-payment transaction further comprises transactions pertaining to a selection from the list consisting of: biometric databases, card databases, and social networking databases.

9. The financial card of claim 6 wherein said means for storing information further comprises the following:
    means for storing other data for performing said payment transaction.

10. The financial card of claim 6 wherein said data for performing said payment transaction comprises identification data.

11. A method for configuring a financial card for concurrently providing information for a payment transaction and information for a non-payment transaction, the method comprising:
    storing, on a first track of a magnetic stripe of a financial card, information for initiating a payment transaction;
    storing, on a second track of the magnetic stripe of the financial card, information for initiating a non-payment transaction, wherein said non-payment transaction comprises a transaction pertaining to a government operated database, wherein said government operated database is a wanted driver database, wherein said transaction pertaining to said government operated database comprises querying said government operated database to determine whether a cardholder associated with said financial card is identified in said government operated database, and wherein, when said cardholder is identified in said government operated database, a notification is sent to a public safety official; and setting a value of a flag field, wherein the flag field is stored within the magnetic stripe of the financial card, wherein the value that indicates an order for initiating said payment transaction and said non-payment transaction, wherein a first value of the flag field indicates that said payment transaction is to be initiated before said non-payment transaction and a second value of the flag field indicates that said non-payment transaction is to be initiated before said payment transaction, and wherein setting said value of the flag field to the second value configures said information for initiating said non-payment transaction to decline said payment transaction when said cardholder is identified in said government operated database.

\* \* \* \* \*